Patented May 3, 1938

2,116,182

UNITED STATES PATENT OFFICE 2,116,182

PRODUCTION OF MERCAPTANS

Karl Baur, Ludwigshafen-on-the-Rhine, Germany, assignor to I. G. Farbenindustrie Aktiengesellschaft, Frankfort-on-the-Main, Germany No Drawing. Application February 24, 1936, Serial No. 65,223. In Germany March 1, 1935

8 Claims. (Cl. 260—156)

The present invention relates to mercaptans and a process of producing same.

I have found that aliphatic mercaptans of high molecular weight i. e. saturated and unsaturated open chain aliphatic and cycloaliphatic mercaptans are obtained by treating aliphatic alcohols containing at least 8 carbon atoms per molecule with hydrogen sulphide at elevated temperatures in the presence of catalysts, especially those having the effect of splitting off water. The process is preferably effected by leading the said alcohols with hydrogen sulphide over the catalysts.

As initial materials for the process according to this invention may be mentioned saturated and unsaturated aliphatic and cycloaliphatic alcohols of high molecular weight (containing at least 12 carbon atoms) or mixtures of such alcohols. High molecular alcohols of any origin may be employed; for example the alcohols obtained by oxidizing paraffin waxes and, if desired, separating off those parts which are no alcohols, or alcohols obtained by hydrogenating the fatty acids obtained from natural glycerides are suitable. Mixtures of alcohols containing at least 8 carbon atoms per molecule with alcohols of low molecular weight may also be started with, mixtures of high and low molecular mercaptans thus being obtained.

The reaction is preferably carried out at temperatures between about 150° and about 450° C. and, if desired, under increased or reduced pressure. Inert gases or vapors, such as nitrogen, carbon dioxide or steam may also be used as diluents. Instead of pure hydrogen sulphide, gases rich in hydrogen sulphide may be employed.

Numerous substances are suitable as catalysts. Substances capable of splitting off water have a specially favourable action, as for example the oxides and salts (phosphates, halides, sulphates or sulphides) of beryllium, magnesium, calcium, strontium, barium, manganese, cadmium, zinc, copper, nickel, iron, titanium, zirconium, cerium, thorium, lead, phosphorus, vanadium, chromium, molybdenum, tungsten and uranium. These materials may be employed alone or in admixture with each other, or together with other substances for example with substances having large surfaces or metals, minerals or clay. The said substances are used either in a ground or otherwise finely divided state as admixtures or in the form of granules or pieces; in this case they serve as carriers on which the catalytically acting substances are arranged. For example alkaline, neutral and acid bleaching earths, base-exchange compounds, zeolites and other silicates, pumice stone, bauxite, clay sherds, magnesia, glass, metal wires, metal grit, melts and slags, coke, graphite, active gels and active carbons may be mentioned for the purpose. Surface-active substances are suitable catalysts also when used alone.

The mercaptans obtainable according to this invention are especially suitable in the first line for the preparation of assistants for the textile industry and also for the preparation of dyestuffs.

The following examples will further illustrate the nature of this invention but the invention is not restricted to these examples. The parts are by volume.

Example 1

A mixture of 1 part of octodecyl alcohol vapor and from 20 to 30 parts of hydrogen sulphide is led at about 320° C. over granulated zirconium dioxide. The material thus obtained contains 90 per cent of octodecyl mercaptan and small amounts of octodecylene and dioctodecyl sulphide. The octodecyl mercaptan boils at from 170° to 171° C. at 1.5 millimeters (mercury gauge) and melts at from 34° to 35° C.

A mixture of zirconium dioxide and pumice meal may be used instead of granular zirconium dioxide. The activity of the catalysts does not subside even after use for several weeks.

Example 2

A mixture of octodecyl alcohol vapor and hydrogen sulphide is led at about 300° C. over active charcoal. The hydrogen sulphide is circulated. The reaction product contains about 80 per cent of octodecyl mercaptan. The activity of the charcoal may be improved by impregnating it with phosphoric acid.

Example 3

Octodecenyl alcohol (obtained from sperm oil alcohol) is vaporized in a stream of an excess of hydrogen sulphide. The vapor mixture is led at about 300° C. over an aluminium oxide catalyst. The reaction product is fractionally distilled under reduced pressure. A fraction boiling at between 151° and 165° C. under a pressure of 1 millimeter (mercury gauge) is obtained in a good yield; it contains about 92 per cent of octodecenyl mercaptan. By fractional distillation the mercaptan may be obtained in a pure form.

Example 4

A mixture of vaporized dodecyl alcohol and excess hydrogen sulphide is led at about 330° C. over granulated titanium dioxide. The reaction product contains from about 75 to 80 per cent of dodecyl mercaptan which boils at between 95° to 100° C. at 1 millimeter (mercury gauge).

*Example 5*

Octodecenyl alcohol (prepared by partial hydrogenation of oleyl aldehyde) is vaporized in 40 times its volume of hydrogen sulphide and the mixture is led at from 300° to 340° C. over a catalyst similar to that employed in Example 1. The reaction product contains about 80 per cent of octodecenyl mercaptan.

Decahydro-alpha-naphthol may be converted into the corresponding mercaptan in a similar manner.

*Example 6*

A mixture of vaporized cetyl alcohol with excess hydrogen sulphide is led at 320° C. over a catalyst similar to that employed in Example 1. The reaction product contains about 85 per cent of cetyl mercaptan. It boils between 140° and 155° C. at 0.8 millimeter (mercury gauge).

What I claim is:—

1. The process of producing aliphatic mercaptans, which comprises treating an aliphatic alcohol containing at least 12 carbon atoms per molecule with hydrogen sulphide at a temperature above about 150° C. in the presence of a catalyst capable of splitting off water.

2. The process of producing aliphatic mercaptans, which comprises treating an aliphatic alcohol containing at least 12 carbon atoms per molecule with hydrogen sulphide at a temperature between about 150° C. and about 450° C. in the presence of a catalyst capable of splitting off water.

3. The process of producing aliphatic mercaptans, which comprises treating a saturated aliphatic alcohol containing at least 12 carbon atoms per molecule with hydrogen sulphide at a temperature between about 150° C. and about 450° C. in the presence of a catalyst capable of splitting off water.

4. The process of producing aliphatic mercaptans, which comprises treating an unsaturated aliphatic alcohol containing at least 12 carbon atoms per molecule with hydrogen sulphide at a temperature between about 150° C. and about 450° C. in the presence of a catalyst capable of splitting off water.

5. The process of producing aliphatic mercaptans, which comprises leading an aliphatic alcohol containing at least 12 carbon atoms in the molecule together with hydrogen sulphide at a temperature above about 150° C. over a catalyst capable of splitting off water.

6. The process of producing aliphatic mercaptans, which comprises leading an aliphatic alcohol containing at least 12 carbon atoms in the molecule together with hydrogen sulphide at a temperature between about 150° C. and about 450° C. over a catalyst capable of splitting off water.

7. Compounds corresponding to the formula R—S—H, wherein R is an unsaturated aliphatic hydrocarbon radicle containing at least 8 carbon atoms per molecule.

8. Octodecenyl mercaptan.

KARL BAUR.